United States Patent
Kobayashi et al.

(10) Patent No.: US 8,205,516 B2
(45) Date of Patent: Jun. 26, 2012

(54) SPEED CONTROL METHOD OF AUTOMATIC TRANSMISSION

(75) Inventors: Kazutaka Kobayashi, Nishio (JP); Takeshige Miyazaki, Chiryu (JP); Fumiaki Ito, Kariya (JP)

(73) Assignee: Aisin Ai Co., Ltd., Nishi-Shi, Aichi-ken (JP)

( * ) Notice: Subject to any disclaimer, the term of this patent is extended or adjusted under 35 U.S.C. 154(b) by 413 days.

(21) Appl. No.: 12/533,326

(22) Filed: Jul. 31, 2009

(65) Prior Publication Data

US 2010/0029438 A1 Feb. 4, 2010

(30) Foreign Application Priority Data

Jul. 31, 2008 (JP) ................................. 2008-198158

(51) Int. Cl.
*F16H 3/08* (2006.01)
*F16H 59/00* (2006.01)

(52) U.S. Cl. ............................ 74/331; 74/339; 74/336 R

(58) Field of Classification Search .................... 74/331, 74/335, 336 R, 339
See application file for complete search history.

(56) References Cited

U.S. PATENT DOCUMENTS

| | | | |
|---|---|---|---|
| 4,519,484 A | | 5/1985 | Nagaoka et al. |
| 5,890,392 A | * | 4/1999 | Ludanek et al. ................. 74/331 |
| 6,869,382 B2 | * | 3/2005 | Leising et al. .................. 477/77 |
| 7,597,020 B2 | * | 10/2009 | Baldwin ..................... 74/336 R |

FOREIGN PATENT DOCUMENTS

| | | |
|---|---|---|
| DE | 199 39 819 C1 | 11/2000 |
| JP | 2006-226380 A | 8/2006 |

OTHER PUBLICATIONS

Extended European Search Report dated Oct. 21, 2009 in European Patent Application No. 09009864.1.

* cited by examiner

*Primary Examiner* — Dirk Wright

(74) *Attorney, Agent, or Firm* — Buchanan Ingersoll & Rooney PC

(57) ABSTRACT

A speed control method for an automatic transmission includes a first synchronizing process, in which a first clutch portion is operated to be in an engaging state in order to synchronize a first input shaft to a power source, a second synchronizing process, in which the first input shaft is synchronized to the output shaft by operating a gear train connected the first input shaft so as to be in an engaging state, after the first clutch portion is operated so as to be in the disengaging state and a torque transmission path switchover process for switching a torque transmitting path from a second input shaft to the first input shaft by operating the first clutch portion so as to be in an engaging state while the second clutch portion is operated so as to be in an disengaging state.

6 Claims, 4 Drawing Sheets

SPEED CONTROL METHOD OF AUTOMATIC TRANSMISSION

CROSS REFERENCE TO RELATED APPLICATIONS

This application is based on and claims priority under 35 U.S.C. §119 to Japanese Patent Application 2008-198158, filed on Jul. 31, 2006, the entire content of which is incorporated herein by reference.

FIELD OF THE INVENTION

The present invention relates to a speed control method for an automatic transmission mounted to a vehicle. More specifically, the present invention relates to a method of a synchronization control for a dual clutch type automatic transmission mounted to the vehicle.

BACKGROUND

A dual clutch type automatic transmission including a dual clutch having two clutch portions, two input shafts, an output shaft and a plurality of gear trains provided between the input shafts and the output shaft, generally known as one type of transmission for a vehicle, may perform a speed change operation in such a way that a torque transmission path is smoothly switched between the two input shafts by means of the clutch portions operated so as to be in an engaging/disengaging state. The dual clutch employs a friction clutch including driving side friction plates and driven side friction plates, in which the driving side friction plates frictionally engage the driven side friction plates in order to transmit the torque of the engine. Each of the gear trains includes a gear ratio for establishing one of four to seven speed stages, and the synchromesh mechanism selects an appropriate gear train so that the rotation speed is changed at the selected gear train. The operations of the dual clutch and the synchromesh mechanism are automatically controlled by means of an operation controlling portion including an electronic control device and an actuator.

A control device for the dual clutch type (e.g., twin clutch type) automatic transmission disclosed in JP2006-226380A operates so as to control the speed of the vehicle in such a way that an appropriate speed control manner is selected on the basis of a driving condition of a driving device such as an engine in order to restrain a delay of the speed change control. According to the dual clutch type automatic transmission disclosed in JP2006-226380A or the like, while the vehicle is traveling, one of the clutch portions is operated so as to be in an engaging state, and a gear train fixed to one of the input shafts is operated so as to be in an engaging state so that the torque is transmitted from the engine to the output shaft via the one of the clutch portions and the one of the input shafts. At this point, the other of the clutch portions is in a disengaging state, and the torque is not transmitted to the output shaft via the other of the clutch portions and the other of the input shafts.

The speed change operation of the dual clutch type automatic transmission generally includes a gear train changing process, a torque transmission path switchover process and a power source synchronizing process. When a speed change operation command is inputted to the control device, one of the gear trains, fixed to the other of the input shafts by which the torque is not transmitted, is operated so as to be in an engaging state in the gear train changing process. At this point, the other of the input shafts starts synchronizing with the output shaft by means of a frictionally synchronizing operation of the synchromesh mechanism.

Then, the control proceeds to the torque transmission path switch over process, and the one of the clutch portions, by which the torque is currently transmitted to the output shaft, is gradually operated so as to be in a disengaging state and at the same time, the other of the clutch portions is gradually operated so as to be in an engaging state. Accordingly, a torque transmission path through which the torque is transmitted to the output shaft is switched from the one of the input shafts to the other of the input shafts. Then the control proceeds to the power source synchronizing process. In the power source synchronizing process, the power source is synchronized with the other of the input shafts. After the power source synchronizing process, the speed change operation is terminated.

According to the known speed change operation for the dual clutch type automatic transmission, in the gear train changing process, a relatively long time is required for synchronizing the other of the input shafts, which is not transmitting the torque, with the output shaft. Accordingly, time for an entire speed change operation may be longer. For example, while the vehicle is traveling at a speed of the second shift stage established by means of the second input shaft transmitting the torque to the output shaft, in a case where an up-shifting operation is executed with up-shifting from a first shift stage established by a first shift stage gear train fixed to the first input shaft to a second shift stage established by a second shift stage year train fixed to the second input shaft, and then the shift stage is further up-shifted from the second shift stage to a third shift stage established by a third shift stage gear train fixed to the first input shaft, the first shift stage gear train fixed to the first input shaft is operated so as to be in an disengaging state, and the third shift stage gear train fixed to the first input shaft is operated so as to be in an engaging state. Specifically, in order to smoothly change the rotation speed of the output shaft, the rotation speed of the first input shaft needs to be drastically reduced from the speed corresponding to the first shift stage to the speed corresponding to the third shift stage. In the known operation, the speed of the input shaft is reduced (or increased) only by the frictionally synchronizing operation of the synchromesh mechanism, which may require more time for the synchronizing operation.

Furthermore, when the clutch portion connected to the input shaft is in a disengaging state, and the gear train fixed to the input shaft is in a disengaging state, the input shaft is idly rotating in accordance with an inertia torque, and in this condition, the rotation speed of the input shaft may be reduced due to the frictional force generated at a bearing portion of the input shaft more time is required for the synchronization between the input shaft and the output shaft. When a dry-type friction clutch not using fluid is used for the clutch portion, the clutch may not perform the synchronizing operation In the same manner as a wet-type friction clutch, which may perform the synchronizing operation effectively by virtue of the viscosity of the fluid. Accordingly, the rotation speed of the idling input shaft may be rapidly decreased using the dry-type clutch, as a result, more time is required for the synchronization between the input shaft and the output shaft.

A need thus exists for a speed control method for an automatic transmission which is not susceptible to the drawback mentioned above.

SUMMARY OF THE INVENTION

According to an aspect of the present invention, a speed control method for an automatic transmission, the automatic transmission including a dual clutch having first and second clutch portions selectively transmit a torque of a power source, a first input shaft connected to the first clutch portion, a second input shaft connected to the second clutch portion, an output shaft outputting the torque, a plurality of gear trains including first, second and third gear trains each connected to one of the first input shaft and the second input shaft and selectively transmitting the torque to the output shaft at an appropriate gear ratio, and an operation controlling portion for operating the dual clutch so as to be in an engaging state and a disengaging state and for operating each of the gear trains so as to be in an engaging and a disengaging state, includes a first synchronizing process, in which the other of the first and second clutch portions is operated so as to be in an engaging state in order to synchronize the other of the first and second input shafts to the power source, when the output shaft transmits the torque via the first gear train fixed to one of the first and second input shafts connected to the one of the first and second clutch portions being in an engaging state while the other of the first and second clutch portions is in a disengaging state, and when any gear train fixed to the other of the first and second input shafts is in a disengaging state, a second synchronizing process, in which the other of the first and second input shafts is synchronized to the output shaft by operating the second gear train connected the other of the first and second input shafts so as to be in an engaging state, after the other of the first and second clutch portions is operated so as to be in the disengaging state and a torque transmission path switchover process for switching a torque transmitting path from using the one of the first and second input shaft to using the other of the first and second input shaft by operating the other of the first and second clutch portions so as to be in an engaging state while the one of the first and second clutch portions is operated so as to be in an disengaging state, thereby synchronizing the power source to the other of the first and second input shaft.

According to an aspect of the present invention, an automatic transmission includes a dual clutch having first and second clutch portions selectively transmit a torque of a power source, a first input shaft connected to the first clutch portion, a second input shaft connected to the second clutch portion, an output shaft outputting the torque; a plurality of gear trains having first, second and third gear trains each connected to one of the first input shaft and the second input shaft and selectively transmitting the torque to the output shaft at an appropriate gear ratio and an operation controlling portion for operating the dual clutch so as to be in an engaging state and a disengaging state and for operating each of the gear trains so as to be in an engaging and a disengaging state, a speed control method having; a first synchronizing process, in which the other of the first and second clutch portions is operated so as to be in an engaging state in order to synchronize the other of the first and second input shafts to the power source, when the output shaft transmits the torque via the first gear train fixed to one of the first and second input shafts connected to the one of the first and second clutch portions being in an engaging state while the other of the first and second clutch portions is in a disengaging state, and when any gear train fixed to the other of the first and second input shafts is in a disengaging state, a second synchronizing process, in which the other of the first and second input shafts is synchronized to the output shaft by operating the second gear train connected the other of the first and second input shafts so as to be in an engaging state, after the other of the first and second clutch portions is operated so as to be in the disengaging state and a torque transmission path switchover process for switching a torque transmitting path from using the one of the first and second input shaft to using the other of the first and second input shaft by operating the other of the first and second clutch portions so as to be in an engaging state while the one of the first and second clutch portions is operated so as to be in an disengaging state, thereby synchronizing the power source to the other of the first and second input shaft.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
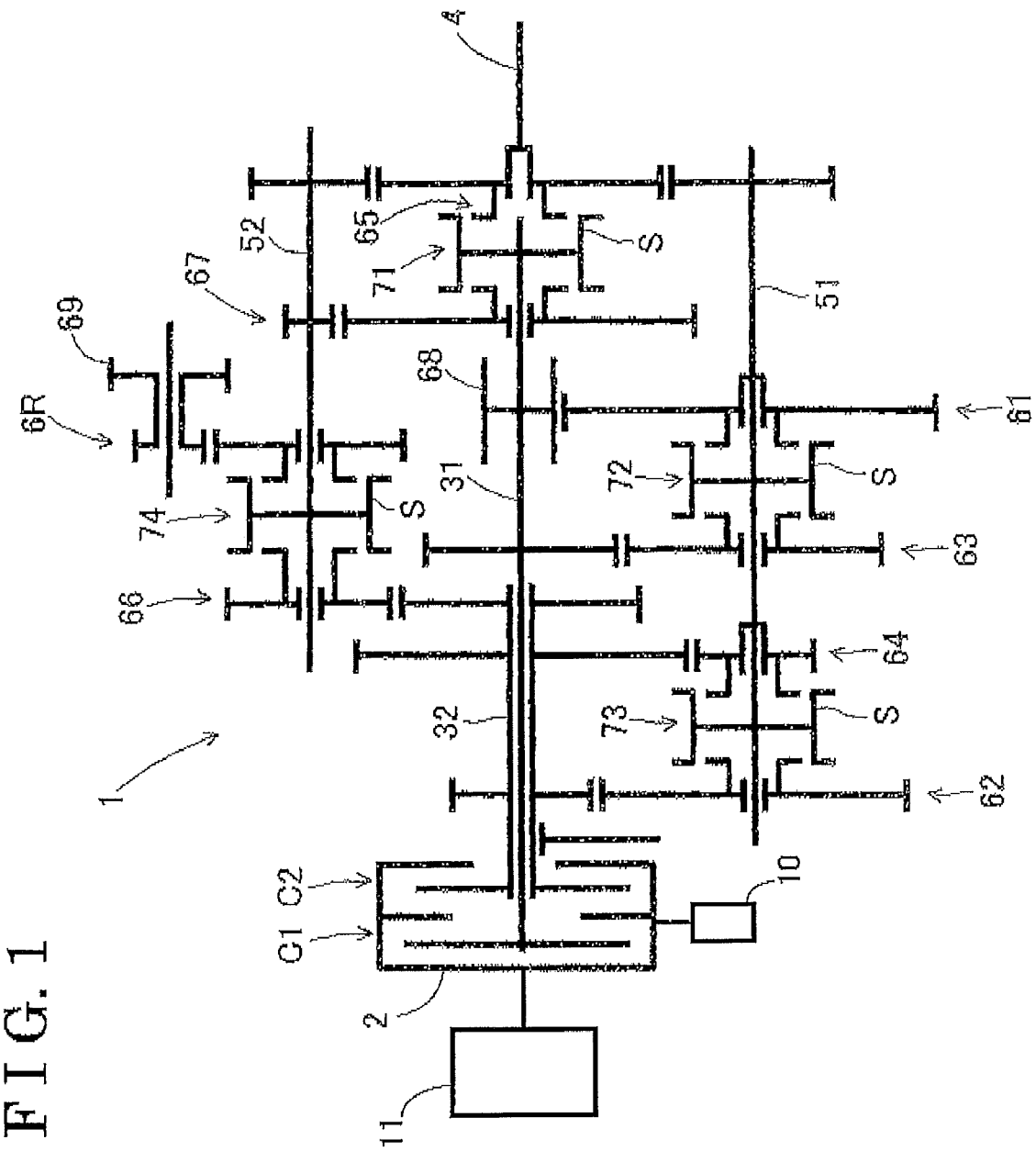
FIG. 1 illustrates a skeleton diagram indicating a dual clutch type automatic transmission to which a speed control method related to the present invention is applied.

An embodiment related to the present invention will be described with reference to the attached drawings of FIGS. 1 through 4. FIG. 1 illustrates a skeleton diagram indicating a dual clutch type automatic transmission 1 to which a speed control method related to the present invention is applied. The dual clutch type automatic transmission 1 includes a dual clutch 2, a first input shaft 31, a second input shaft 32, an output shaft 4, a first counter shaft 51, a second counter shaft 52, a first shift stage gear train 61 (e.g., a third gear train), a second shift stage gear train 62 (e.g., a first gear train), a third shift stage gear train 63 (e.g., a second gear train), a fourth shift stage gear train 64, a fifth shift stage gear train 65, a sixth shift stage gear train 66, a seventh shift stage gear train 67, a reverse movement gear train 6R, a fifth and seventh shift stages synchromesh mechanism 71, a first and third shift stages synchromesh mechanism 72, a second and fourth shift stages synchromesh mechanism 73, a sixth shift stage and rear shift stage synchromesh mechanism 74 and an operation controlling portion 10.

The dual clutch 2 includes a first clutch portion C1 used for transmitting torque of an engine 11 (e.g., a power source) to the first input shaft 31 and a second clutch portion C2 used for transmitting the torque of the engine to the second input shaft 32. Each of the clutch portions C1 and C2 is comprised of a dry-type friction clutch independently operated by the operation controlling portion 10 so as to be in an engaging state or a disengaging state. The first input shaft 31 is formed in a rod shape, and the second input shaft 32 is formed in a hollowed-out rod shape. The first input shaft 31 is arranged in the hollow of the second input shaft 32. In this configuration, as illustrated in FIG. 1, a left end portion of the first input shaft 31 is connected to the first clutch portion C1 of the dual clutch 2, and a left portion of the second input shaft 32 is connected to the second clutch portion C2 of the dual clutch 2. The first input shaft 31 and the second input shaft 32 are rotatable at certain rotation speeds, which are different from each other, and the first clutch portion C1 and the first input shaft 31 form a first torque transmission path, and the second clutch portion C2 and the second input shaft 32 form a second torque transmission path. The output shaft 4 is connected to a right end portion of the first input shaft 31 so as to be coaxial therewith. Moreover, being parallel with the first input shaft 31, the second input shaft 32 and the output shaft 4, the first counter shaft 51 is arranged below three shafts in FIG. 1, and the second counter shaft 52 is arranged above the three shafts in FIG. 1.

Each of the shift stage gear trains 61 through 67 and 6R is connected to the first input shaft 31 or the second input shaft 32 at one end, and is connected to the output shaft 4 at the other end. Specifically, odd-numbered gear trains are connected to the first input shaft 31, and the gear trains are arranged in the order of the third shift stage gear train 63, the first shift stage gear train 61, the reverse gear train 6R, the seventh shift stage gear train 67 and the fifth shift stage gear train 65, from left to right in FIG. 1. The third shift stage gear train 63 and the first shift stage gear train 61 are connected to the output shaft 4 via the first counter shaft 51, the seventh shift stage gear train 67 is connected to the output shaft 4 via the second counter shaft 52. The fifth shift stage gear train 65 is provided at the right end portion of the first input shaft 31 and is directly connected to the output shaft 4. The reverse gear train 6R is connected to the output shaft 4 by means of a drive gear 68 commonly used by the first shift stage gear train 61 via a reverse idler gear 69 and the second counter shaft 52. On the other hand, even-numbered gear trains are connected to the second input shaft 32, and the gear trains are arranged in order from the second shift stage gear train 62, the fourth shift stage gear train 64 and to the sixth shift stage gear train 66, from the left to the right in FIG. 1. The second shift stage gear train 62 and the fourth shift stage gear train 64 are connected to the output shaft 4 via the first counter shaft 51, and the sixth shift stage gear train 66 is connected to the output shaft 4 via the second counter shaft 52.

Each of the shift stage gear trains 61 through 67 and 6R is selected and operated so as to be engaged/disengaged by one of the four synchromesh mechanisms 71 through 74. Specifically, the fifth and seventh shift stages synchromesh mechanism 71 connected to the right end portion of the first input shaft 31 selects the fifth shift stage gear train 65 in such a way that a sleeve S of the fifth and seventh shift stages synchromesh mechanism 71 is moved to the right in FIG. 1, and the fifth and seventh shift stages synchromesh mechanism 71 selects, on the other hand, the seventh shift stage gear train 67 in such a way that the sleeve S of the fifth and seventh shift stages synchromesh mechanism 71 is moved to the left in FIG. 1. When the sleeve S is positioned in the middle (not to be moved either to the right or left), the synchromesh mechanism is in a neutral state. The first and third shift stages synchromesh mechanism 72 connected to the right portion of the first counter shaft 51 selects the first shift stage gear train 61 in such a way that a sleeve S of the first and third shift stages synchromesh mechanism 72 is moved to the right in FIG. 1, and the first and third shift stages synchromesh mechanism 72 selects the third shift stage gear train 63 in such a way that the sleeve S of the first and third shift stages synchromesh mechanism 72 is moved to the left in FIG. 1. The second and fourth shift stages synchromesh mechanism 73 connected to the left portion of the first counter shaft 51 selects the second shift stage gear train 62 in such a way that a sleeve S of the second and fourth shift stages synchromesh mechanism 73 is moved to the left in FIG. 1, and the second and fourth shift stages synchromesh mechanism 73 selects the fourth shift stage gear train 64 in such a way that the sleeve S of the second and fourth shift stages synchromesh mechanism 73 is moved to the right in FIG. 1. The sixth shift stage and reverse shift stage synchromesh mechanism 74 connected to the second counter shaft 52 selects the sixth shift stage gear train 66 in such a way that a sleeve S of the sixth shift stage and reverse shift stage synchromesh mechanism 74 is moved to the left in FIG. 1, and the sixth shift stage and reverse shift stage synchromesh mechanism 74 selects the reverse gear train 6R in such a way that the sleeve S of the sixth shift stage and reverse shift stage synchromesh mechanism 74 is moved to the right in FIG. 1. The sleeves S of the synchromesh mechanisms 71 through 74 are operated by the operation controlling portion 10.

The operation controlling portion 10 includes a clutch actuator, a synchromesh mechanism actuator and an electronic control device. The clutch actuator operates the clutch portion C1 and the clutch portion C2 respectively, the synchromesh mechanism actuator operates the four synchromesh mechanisms 71 through 74, and the electronic control device controls the clutch actuator and the synchromesh mechanism actuator. Further, an operation amount detecting means is provided at the operation controlling portion 10 in order to detect operation amounts of the clutch actuator and the synchromesh mechanism actuator. Thus, the electronic control device may execute a feed-back control on the basis of the detected operation amounts. A speed control method of the dual clutch type automatic transmission 1 is executed by software of the electronic control device.

Figure 2:
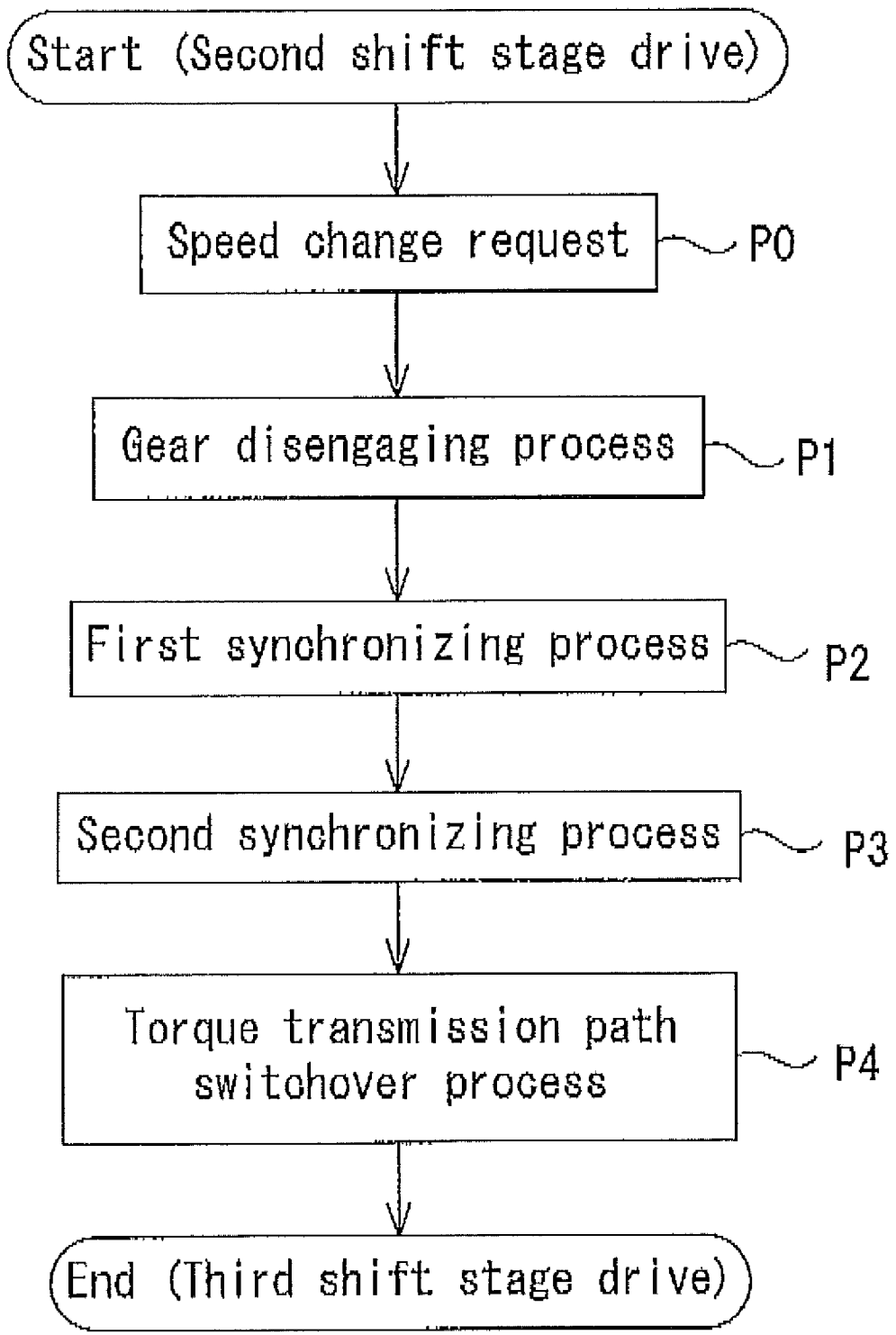
FIG. 2 illustrates a flowchart of the speed control method of an embodiment applied to the dual clutch type automatic transmission.
Figure 3:
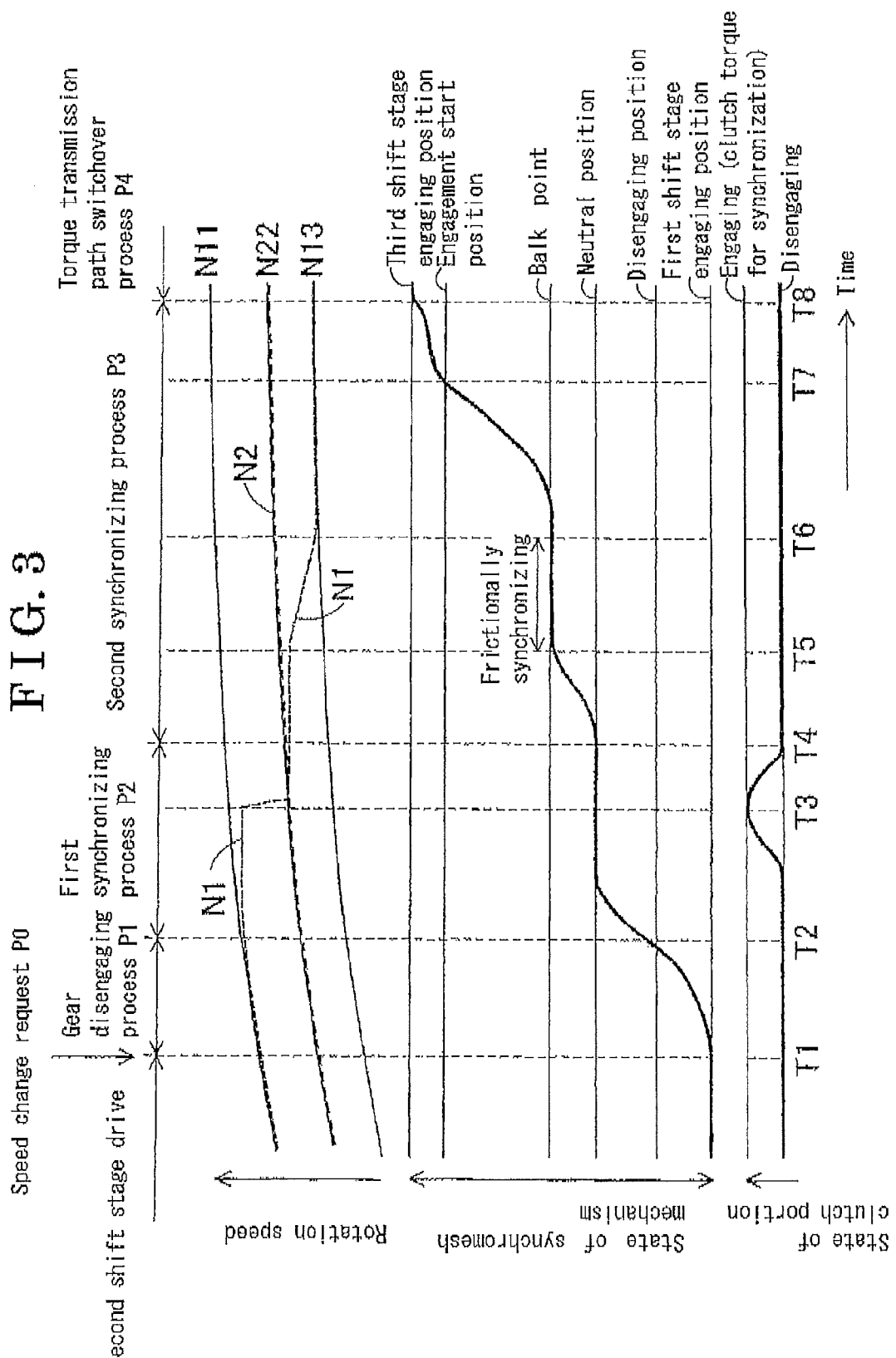
FIG. 3 illustrates a time chart of the speed control method of the embodiment applied to the dual clutch type automatic transmission.

The speed control method for the dual clutch type automatic transmission 1, which is structured as described above, will be explained in accordance with the drawings of FIGS. 2 and 3. The drawing of FIG. 2 is a flowchart for explaining the speed control method in the embodiment related to the present invention, the drawing of FIG. 3 is a time chart for explaining the speed control method. The time chart in FIG. 3 indicates a speed control method of an up-shifting operation executed in a manner where the speed of the vehicle is changed from the first shift stage to the third shift stage via the second shift stage, which is the current speed of the vehicle. A horizontal axis of the time chart indicates time, which is commonly used, and an upper portion of a vertical axis of the time chart indicates a rotation speed of each shaft, a middle portion of the vertical axis of the time chart indicates a state of the first and third shift stages synchromesh mechanism 72, and a lower portion of the vertical axis of the time chart indicates a state of the second clutch portion C2 (engaged/disengaged). Three solid lines in the upper portion of the time chart indicate a rotation speed of each shaft. Specifically, the top line indicates a rotation speed N11 of the input shaft 31 when the first shift stage gear train 61 is in an engaging state, the middle line indicates a rotation speed N22 of the second input shaft 32 when the second shift stage gear train 62 in an engaging state, and the bottom line indicates a rotation speed N13 of the first input shaft 31 when the third shift stage gear train 63 is in a engaging state.

Two dotted lines in the upper portion of the time chart each indicates an actual rotation speed N1 of the first input shaft 31 and an actual rotation speed N2 (corresponding to N22) of the second shift stage gear train 62. When the line indicating the rotation speed shows an upward-sloping curve, the rotation speed of the output shaft is increasing, in other words, the vehicle accelerates. At the time point T1, the gear train is requested to change from the second shift stage to the third shift stage, in other words, the time point T1 indicates a start point of the speed changing operation.

When the vehicle is moving at the second shift stage before the time point T1 in FIG. 3, the second clutch portion C2 in FIG. 1 is in an engaging state, and the sleeve S of the second and fourth shift stages synchromesh mechanism 73 is moved to the left so as to be engaged with the second shift stage gear train 62. In this configuration, the torque of the engine is transmitted to the output shaft 4 through the second clutch portion C2, the second input shaft 32, the second shift stage gear train 62 and the first counter shaft 51. At this point, the first clutch portion C1 connected to the first input shaft 31 is in a disengaging state, however, the first shift stage gear train 61, which is used in the previous shift stage, is in the engaging state by means of the sleeve of the first and third shift stages synchromesh mechanism 72. In other words, the first input shaft 31 is rotated at the rotation speed N11 in accordance with the output shaft 4 via the first shift stage gear train 61.

When the vehicle is traveling at the second shift stage, and the vehicle speed is increased, the electronic control device outputs a speed change request PO, and on the basis of the speed change request PO, the up-shifting operation is started. During a gear disengaging process P1, as indicated in the middle portion in the vertical axis in the time chart, the sleeve S of the first and third shift stages synchromesh mechanism 72, which is engaged with the first stage gear train 61, is moved toward the neutral position. When the first shift stage gear train 61 is in a disengaging state at a time point T2, the first input shaft 31 is in an idly rotating state, and the control proceeds to the first synchronizing process P2. Even in the first synchronizing process P2, the sleeve S is kept moving until it reaches the neutral position.

During the first synchronizing process P2, as indicated in the bottom portion in the vertical axis of the time chart of FIG. 3, a small amount of a clutch torque for synchronizing is applied to the first clutch portion C1. At a time point T3, the first clutch portion C1 is temporally operated so as to be in an engaging state by use of the small amount of the clutch torque, in other words, the first clutch portion C1 becomes a half clutch state. Accordingly, the first input shaft 31 is rotated in synchronization with a main shaft of the engine. At this point, because a clutch torque capacity of the first clutch portion C1 is significantly larger than that of the synchromesh mechanism, the actual rotation speed N1 of the first input shaft 31 is rapidly decreased so as to reach the actual rotation speed N2 of the second input shaft 32, which is currently used for transmitting the engine torque. Then, the first clutch portion C1 is operated so as to be in a disengaging state again at a time point T4, and the control proceeds to the second synchronizing process P3.

At the second synchronizing process P3, the sleeve S of the first and third shift stages synchromesh mechanism 72 is moved from the neutral position toward the third gear train 63, then the sleeve S reaches a balk point, and then the actual rotation speed N1 of the first input shaft 31 is gradually reduced so as to reach the rotation speed 13 in accordance with the frictionally synchronizing operation of the synchromesh mechanism. At a time point T6, the actual rotation speed N1 of the first input shaft 31 reaches the rotation speed 13, and at this point, the synchronization between the first input shaft 31 and the output shaft 4 is established. After the synchronization is established, the sleeve S of the first and third shift stages synchromesh mechanism 72 is further moved toward the third shift stage gear train 63, and at a time point T7, the sleeve S is press-fitted to the third shift stage gear train 63, and the engagement between the sleeve S and the third shift stage gear train 63 is started. Further, at a time point T8, the sleeve S reaches a position where it engages with the third shift stage gear train 63. At the time point T8, the first input shaft 31 is synchronizing with the output shaft 4 via the third shift stage gear train 63. On the other hand, the second input shaft 32 is synchronizing with the output shaft 4 via the second shift stage gear train 62. In this configuration, because the first clutch portion C1 is in the disengaging state, and the second clutch portion C2 is in the engaging state, the engine torque is transmitted to the output shaft 4 through the second clutch portion C2, the second input shaft 32 and the second shift stage gear train 62. Accordingly, at the time point T8, the control proceeds to a torque transmission path switchover process P4.

In the torque transmission path switchover process P4, the second clutch portion C2 is operated so as to be in a disengaging state, while the first clutch portion C1 is operated so as to be in an engaging sate, in order to switch the transmission path of the engine torque from using the second input shaft 32 to using the first input shaft 31.

At this point, because a slide is generated at the first clutch portion C1, the rotation speed of the engine is controlled so as to be synchronized with the first input shaft 31. Accordingly, the engine torque is transmitted from the main shaft of the engine to the output shaft 4 through the first clutch portion C1, the first input shaft 31 and the third shift stage gear train 63, and then the speed control method is terminated.

Next, a known speed control method for the dual clutch type automatic transmission 1 illustrated in the drawing of FIG. 1 will be explained with reference to FIG. 4. A time chart in FIG. 4 indicates an up-shifting operation executed by the known speed control method in a manner where the speed of the vehicle is changed from the first shift stage to the third shift stage via the second shift stage, at which the vehicle is currently traveling. When the up-shifting operation is started at a time point T11, according to the known speed control method, the sleeve S of the first and third shift stages synchromesh mechanism 72 is directly moved from the position at which the sleeve S is engaged with the first shift stage gear train 61 to the position at which the sleeve S is engaged with the third shift stage gear train 63, without stopping at the neutral position. The actual rotation speed N1 of the first input shaft 31 is maintained to the rotation speed N11 at a time point T11, however, at the point where the sleeve disengages the first shift stage gear train 61, the first input shaft 31 starts rotating idly, and after the time point T12, the actual rotation speed N1 is gradually reduced so as to reach the rotation speed N13. Because the clutch torque capacity of the first and third shift stages synchromesh mechanism 72 is smaller than the clutch torque capacity of each the clutch portions C1 and C2, the actual rotation speed N1 gradually changes at this point. Then, at a time point T13, after the actual rotation speed N1 of the first input shaft 31 reaches the rotation speed 13, a synchronization between the first input shaft 31 and the output shaft 4 is established. During the above speed control processes, the first clutch portion C1 is not operated and is in a disengaging state. The process after the synchronization is similar to the embodiment related to the present invention. After the synchronization is established, the sleeve S of the first and third shift stages synchromesh mechanism 72 is further moved, and at a time point T14, the sleeve S is press-fitted to the third shift stage gear train 63, and the engagement between the sleeve S and the third shift stage gear train 63 is started. Further, at a time point T15, the sleeve S reaches a position where it engages with the third shift stage gear train 63. Then, the control proceeds to the torque transmission path switchover process.

Figure 4:
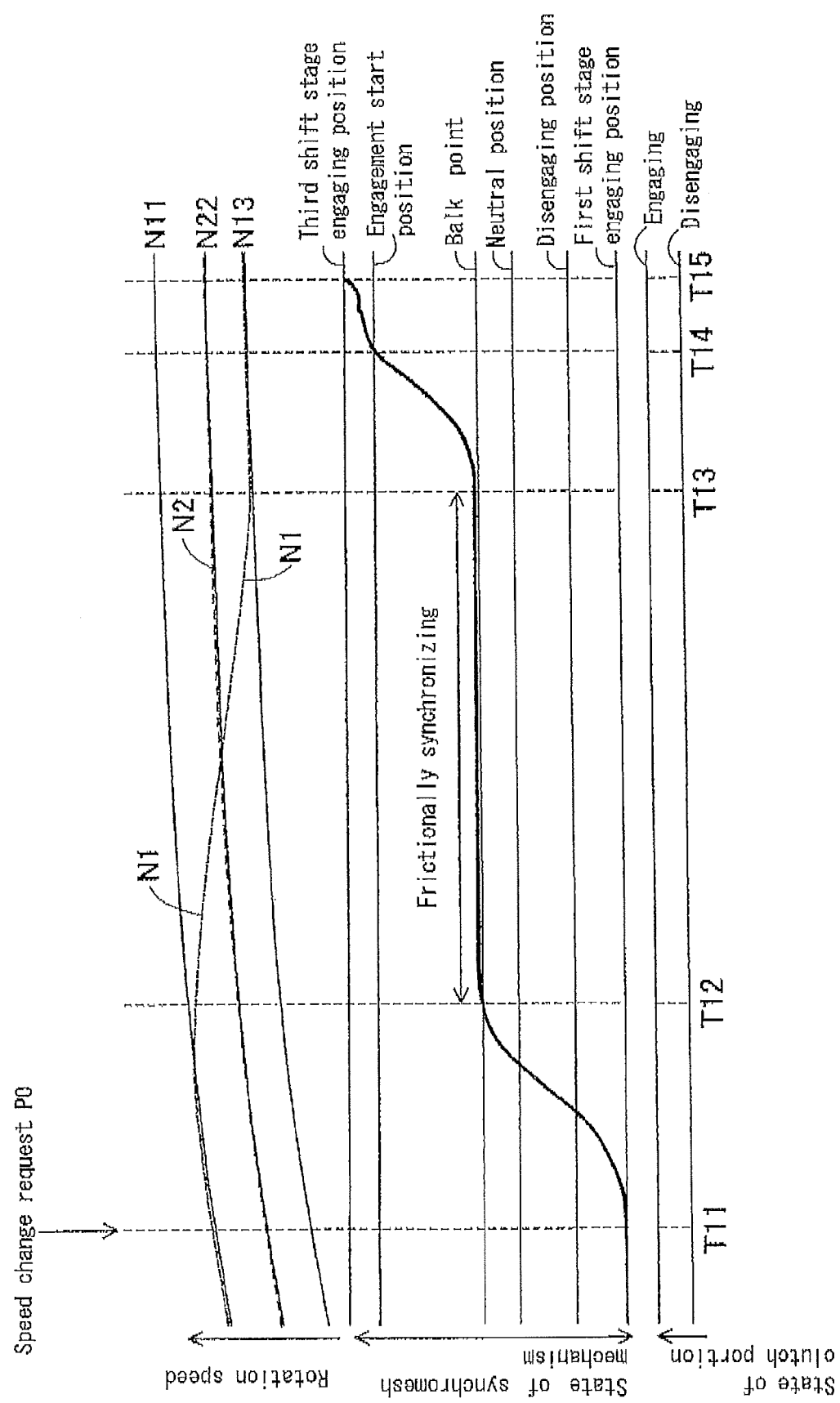
FIG. 4 illustrates a time chart of a known speed control method applied to the dual clutch type automatic transmission.

Compared to the known speed control method indicated in FIG. 4, according to the speed control method in the embodiment, the actual rotation speed N1 of the first input shaft 31 is rapidly decreased so as to reach the rotation speed N22. In other words, the first clutch portion C1 having a large clutch torque capacity executes a part of the frictionally synchronizing operation, normally executed by the synchromesh mechanism, within a short time period.

Thus, a difference between the rotation speed of the output shaft 4 and the rotation speed of the first input shaft 31, to which the third shift stage gear train 63 is fixed, is reduced in approximately half, accordingly the time required for the frictionally synchronizing operation in the second synchronizing process may be dramatically reduced, which leads to a reduction of time for the entire speed control operation.

A speed control method for an automatic transmission, which includes a dual clutch having first and second clutch portions selectively transmit a torque of a power source, a first input shaft connected to the first clutch portion, a second input shaft connected to the second clutch portion, an output shaft outputting the torque, a plurality of gear trains including first, second and third gear trains each connected to one of the first input shaft and the second input shaft and selectively transmitting the torque to the output shaft at an appropriate gear ratio, and an operation controlling portion for operating the dual clutch so as to be in an engaging state and a disengaging state and for operating each of the gear trains so as to be in an engaging and a disengaging state, includes a first synchronizing process, in which the other of the first and second clutch portions is operated so as to be in an engaging state in order to synchronize the other of the first and second input shafts to the power source when the output shaft transmits the torque via the first gear train fixed to one of the first and second input shafts connected to the one of the first and second clutch portions being in an engaging state while the other of the first and second clutch portions is in a disengaging state, and when any gear train fixed to the other of the first and second input shafts is in a disengaging state, a second synchronizing process, in which the other of the first and second input shafts is synchronized to the output shaft by operating the second gear train connected the other of the first and second input shafts so as to be in an engaging state, after the other of the first and second clutch portions is operated so as to be in the disengaging state and a torque transmission path switchover process for switching a torque transmitting path from using the one of the first and second input shaft to using the other of the first and second input shaft by operating the other of the first and second clutch portions so as to be in an engaging state while the one of the first and second clutch portions is operated so as to be in an disengaging state, thereby synchronizing the power source to the other of the first and second input shaft.

In the speed change operation for the dual clutch type automatic transmission, immediately before the synchronization between the output shaft and the input shaft being in an idling state is established by operating the gear train, fixed to the input shaft being in the idling state, so as to be in an engaging state, the clutch portion to which the input shaft being in the idling state is connected is temporally operated so as to be in an engaging state so that the input shaft being in the idling state is temporally synchronized with the power source in order to reduced a difference between the rotation speed of the input shaft and the rotation speed of the output shaft. Accordingly, the time required for the frictionally synchronizing operation of the synchromesh mechanism for operating the selected gear train so as to be in an engaging state, may be reduced. In other words, a part of the frictionally synchronizing operation of the synchromesh mechanism may be alternatively and effectively executed by the clutch portion having a large clutch torque capacity.

The power source connected to the automatic transmission is a generally-used engine, and either a dry-type friction clutch or a wet-type friction clutch may be used for the two clutch portions of the dual clutch. One of the input shafts is formed in a rod-shape (e.g., the first input shaft), and the other of the input shafts is formed in a hollowed-out rod shape (e.g., the second input shaft), and the rod-shaped input shaft is arranged in the hollow of a hollowed-out input shaft. The output shaft is arranged so as to be in parallel with the two input shafts, and each of the gear trains may be used for establishing one of gear ratios of, for example four to seven speed stages, and the synchromesh mechanism selects an appropriate gear train so that the rotation speed is changed at the selected gear train. The operation controlling portion may include an electronic control device and an actuator operated by an oil fluid pressure or an electric power for switching the dual clutch or for operating the synchromesh mechanism.

The speed control method of the automatic transmission includes at least three processes; the first synchronizing process, the second synchronizing process and the torque transmission path switchover process. Immediately before the speed change operation, one of the first and second clutch portions (e.g., the second clutch portion) is in an engaging state, while the other of the first and second clutch portions (e.g., the first clutch portion) is in a disengaging state, and the second shift stage gear train fixed to the second input shaft is in an engaging state so that the torque of the engine is transmitted to the output shaft via the second gear train. On the other hand, the first clutch portion is in the disengaging state, and any gear train fixed to the first input shaft is not in the engaging state. In other words, while the vehicle is traveling, the main shaft of the engine, the input shaft transmitting the torque and the output shaft are synchronizing with each other via the second shift stage gear train. On the other hand, the input shaft, connected to the first clutch portion and fixed to gear trains any of which is not in the engaging state, is not transmitting the torque and is idly rotating by use of an inertia torque.

In this state, in the first synchronizing process, the first clutch portion is operated so as to be in the engaging state in order to synchronize the first input shaft with the power source. In other words, the first clutch portion may be synchronizing with the main shaft of the engine by the temporal engagement of the first clutch portion. Because a gear ratio of any gear train fixed to the first input shaft is not similar to the gear ratio of the second shift stage gear train, after the temporal engagement of the first clutch portion, although the first input shaft may not be completely synchronizing with the output shaft, the rotation speed difference between the output shaft and the first input shaft may be reduced to some extent. Further, because the clutch torque capacity of the clutch portion is sufficiently larger than that of the synchromesh mechanism, the rotation speed difference may be reduced within a short time.

Then, in the second synchronizing process, the first clutch portion is operated so as to be in the disengaging state, and then the third shift stage gear train fixed to the first input shaft is operated so as to be in the engaging state in order to synchronize the first input shaft to the output shaft. In other words, after the first clutch portion, that is temporally in the engaging state, is operated so as to be in the disengaging state, the third shift stage gear train fixed to the first input shaft is operated by the synchromesh mechanism so as to be in an engaging state, as a result, the first input shaft may be synchronized with the output shaft by means of the second gear train. At this point, because the rotation speed difference between the first input shaft and the output shaft has been reduced in the first synchronizing process, the time required for the frictionally synchronizing operation may be shorten.

Finally, in the torque transmission path switchover process, the first clutch portion is operated so as to be in an engaging state, while the second clutch portions Is operated so as to be in a disengaging state, in order to synchronize the first input shaft to the power source. In other words, the state of the clutch portion is switched in order to change to the torque transmission path via the first input shaft. Further, when the first input shaft is synchronized with the power source, the rotation speed of the engine may be controlled so as not to generate a slide on the clutch portions, and the controlled rotation speed of the torque is transmitted from the main shaft of the engine to the output shaft via the first input shaft, and then the speed change operation is terminated.

According to the speed control method, in the first synchronizing process, the rotation speed difference between the output shaft and the first input shaft may be reduced within a short time by operating the first clutch portion in order to synchronize the first input shaft to the power source, and this synchronization may lead to a reduction of time required for the frictionally synchronizing operation executed by the synchromesh mechanism. Accordingly, compared to the known method in which the synchronizing operation is executed only by the synchromesh mechanism, the speed control method in the embodiment related to the present invention may shorten the time required for the entire speed change operation in accordance with the reduction of the rotation speed difference between the input shaft and the power source in the first synchronizing process.

According to the speed control method for the automatic transmission in the embodiment, a level of a clutch torque applied to the other of the first and second clutch portions in the first synchronizing process in order to synchronize the other of the first and second input shafts to the power source is set so as to be smaller than a level of a clutch torque applied to the other of the first and second clutch portions in order to transmit the torque from the power source to the output shaft by means of the other of the first and second input shafts and one of the gear trains fixed to the other of the first and second input shafts.

In the first synchronizing process, the first clutch portion is temporally operated so as to be in an engaging state, the engaging operation may effect only the first input shaft and may not effect the output shaft and the wheels. Thus, the first input shaft may be easily synchronized with the power source by applying the small amount of the clutch torque of the synchronization to the clutch portion. In this configuration, the clutch portion may be operated with a small amount of operation stroke, and the clutch portion may be operated so as to be engaged/disengaged in a shorter time than an operation stroke required for the torque transmission path switchover process.

The speed control method for the automatic transmission in the embodiment further includes a gear disengaging process for operating the third gear train fixed to the other of the first and second input shafts so as to be in a disengaging state before the first synchronizing process is executed.

Immediately before the speed change operation is started, when the first shift stage gear train connected to the first input shaft is in the engaging stage, in other words, the first input shaft is driven by the output shaft, the first shift stage gear train is operated so as to be in an disengaging, state in the gear disengaging process so that the first input shaft becomes in the idling state, and then the control proceeds to the first synchronizing process.

According to the speed control method for the automatic transmission, a gear ratio of the first gear train is set between a gear ratio of the second gear train and a gear train of the third gear train.

According to the embodiment, the gear ratio of the second shift stage gear train is set between the gear ratio of the first shift stage gear train and the gear ratio of the third shift stage gear train. For example, when the shift stage is up-shifted from the first shift stage to the third shift stage via the second shift stage that is a current shift stage, the rotation speed of the first input shaft needs to be reduced from the rotation speed corresponding to the first shift stage to the rotation speed corresponding to the third shift stage, and in this situation, the speed control method in the embodiment may effectively contribute to the reduction of the time required for the speed change operation. The speed control method in the embodiment may be applied to the down-shifting operation from the higher shift stage to the lower shift stage.

The speed control method in the embodiment may contribute to the reduction of the time required for the speed change operation even when the up-shifting operation (down-shifting operation) is executed among the gear trains not fulfilling the abovementioned gear ratio relationship. The speed control method related to the present invention is not necessarily to be applied all of the speed change operations, and may be applied in combination with the known speed control method. For example, when a rotation speed of the first input shaft detected by the rotation speed detecting sensor is substantially close to the rotation speed of the output shaft, the speed control method related to the present invention may not be executed.

According to the speed control method for the automatic transmission in the embodiment, the first and second clutch portions each includes a dry-type friction clutch.

According to the speed control method for the automatic transmission in the embodiment, the operation controlling portion includes a synchromesh mechanism selecting one of the gear trains so as to change the torque at the selected gear train.

Thus, the speed control method may be applied to the automatic transmission including the dual clutch having dry-type friction clutches and the synchromesh mechanism for selecting one of the gear trains so as to change the torque at the selected gear train.

The invention claimed is:

1. A speed control method for an automatic transmission, the automatic transmission including: a dual clutch having first and second clutch portions selectively transmit a torque of a power source; a first input shaft connected to the first clutch portion; a second input shaft connected to the second clutch portion; an output shaft outputting the torque; a plurality of gear trains including first, second and third gear trains each connected to one of the first input shaft and the second input shaft and selectively transmitting the torque to the output shaft at an appropriate gear ratio; and an operation controlling portion for operating the dual clutch so as to be in an engaging state and a disengaging state and for operating each of the gear trains so as to be in an engaging and a disengaging state, comprising:

a first synchronizing process, in which the other of the first and second clutch portions is operated so as to be in an engaging state in order to synchronize the other of the first and second input shafts to the power source, when the output shaft transmits the torque via the first gear train fixed to one of the first and second input shafts connected to the one of the first and second clutch portions being in an engaging state while the other of the first and second clutch portions is in a disengaging state, and when any gear train fixed to the other of the first and second input shafts is in a disengaging state;

a second synchronizing process, in which the other of the first and second input shafts is synchronized to the output shaft by operating the second gear train connected to the other of the first and second input shafts so as to be in an engaging state, after the other of the first and second clutch portions is operated so as to be in the disengaging state;

a torque transmission path switchover process for switching a torque transmitting path from using the one of the first and second input shafts to using the other of the first and second input shafts by operating the other of the first and second clutch portions so as to be in an engaging state while the one of the first and second clutch portions is operated so as to be in an disengaging state, thereby synchronizing the power source to the other of the first and second input shafts; and wherein a level of a clutch torque applied to the other of the first and second clutch portions in the first synchronizing process in order to synchronize the other of the first and second input shafts to the power source is smaller than a level of a clutch torque applied to the other of the first and second clutch portions in order to transmit the torque from the power source to the output shaft by the other of the first and second input shafts and one of the gear trains fixed to the other of the first and second input shafts.

2. The speed control method for the automatic transmission according to claim 1 further including a gear disengaging process for operating the third gear train fixed to the other of the first and second input shafts so as to be in a disengaging state before the first synchronizing process is executed.

3. The speed control method for the automatic transmission according to claim 1, wherein a gear ratio of the first gear train is set between a gear ratio of the second gear train and a gear train of the third gear train.

4. The speed control method for the automatic transmission according to claim 1, wherein the first and second clutch portions each includes a dry-type friction clutch.

5. The speed control method for the automatic transmission according to claim 1, wherein the operation controlling portion includes a synchromesh mechanism selecting one of the gear trains so as to change the torque at the selected gear train.

6. An automatic transmission comprising:
a dual clutch having first and second clutch portions selectively transmit a torque of a power source;
a first input shaft connected to the first clutch portion; a second input shaft connected to the second clutch portion;
an output shaft outputting the torque;
a plurality of gear trains having first, second and third gear trains each connected to one of the first input shaft and the second input shaft and selectively transmitting the torque to the output shaft at an appropriate gear ratio;
an operation controlling portion for operating the dual clutch so as to be in an engaging state and a disengaging state and for operating each of the gear trains so as to be in an engaging and a disengaging state; and
a speed control method having:
a first synchronizing process, in which the other of the first and second clutch portions is operated so as to be in an engaging state in order to synchronize the other of the first and second input shafts to the power source, when the output shaft transmits the torque via the first gear train fixed to one of the first and second input shafts connected to the one of the first and second clutch portions being in an engaging state while the other of the first and second clutch portions is in a disengaging state, and when any gear train fixed to the other of the first and second input shafts is in a disengaging state;
a second synchronizing process, in which the other of the first and second input shafts is synchronized to the output shaft by operating the second gear train connected to the other of the first and second input shafts so as to be in an engaging state, after the other of the first and second clutch portions is operated so as to be in the disengaging state;
a torque transmission path switchover process for switching a torque transmitting path from using the one of the first and second input shafts to using the other of the first and second input shafts by operating the other of the first and second clutch portions so as to be in an engaging state while the one of the first and second clutch portions is operated so as to be in an disengaging state, thereby synchronizing the power source to the other of the first and second input shafts; and
wherein a level of a clutch torque applied to the other of the first and second clutch portions in the first synchronizing process in order to synchronize the other of the first and second input shafts to the power source is smaller than a level of a clutch torque applied to the other of the first and second clutch portions in order to transmit the torque from the power source to the output shaft by the other of the first and second input shafts and one of the gear trains fixed to the other of the first and second input shafts.

* * * * *

UNITED STATES PATENT AND TRADEMARK OFFICE
CERTIFICATE OF CORRECTION

PATENT NO.         : 8,205,516 B2
APPLICATION NO.    : 12/533326
DATED              : June 26, 2012
INVENTOR(S)        : Kazutaka Kobayashi et al.

It is certified that error appears in the above-identified patent and that said Letters Patent is hereby corrected as shown below:

In Section (73) Assignee, please change "Nishi-Shi" to --Nishio-Shi--.

Signed and Sealed this
Thirtieth Day of October, 2012

David J. Kappos
*Director of the United States Patent and Trademark Office*